US012749474B2

(12) United States Patent
Wang et al.

(10) Patent No.: US 12,749,474 B2
(45) Date of Patent: Sep. 29, 2026

(54) ACTIVE NOISE REDUCTION SYSTEM

(71) Applicant: HONDA MOTOR CO., LTD., Tokyo (JP)

(72) Inventors: Xun Wang, Saitama (JP); Toshio Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 18/794,546

(22) Filed: Aug. 5, 2024

(65) Prior Publication Data

US 2025/0054485 A1 Feb. 13, 2025

(30) Foreign Application Priority Data

Aug. 9, 2023 (JP) ................................ 2023-130175

(51) Int. Cl.
*G10K 11/178* (2006.01)

(52) U.S. Cl.
CPC .. *G10K 11/17825* (2018.01); *G10K 11/17823* (2018.01); *G10K 11/17883* (2018.01); *G10K 2210/1282* (2013.01)

(58) Field of Classification Search
CPC ....... G10K 11/17825; G10K 11/17817; G10K 11/17823; G10K 11/17833; G10K 11/17815; G10K 11/17881; G10K 11/17883; G10K 2210/1282; G10K 2210/3055
See application file for complete search history.

(56) References Cited

U.S. PATENT DOCUMENTS

| | | | | |
|---|---|---|---|---|
| 8,378,804 | B2 | 2/2013 | Inoue | |
| 9,923,550 | B2 | 3/2018 | Argyropoulos et al. | |
| 10,741,162 | B1 * | 8/2020 | Bastyr | G10K 11/17817 |

(Continued)

FOREIGN PATENT DOCUMENTS

| | | | |
|---|---|---|---|
| JP | H0728474 | A | 1/1995 |
| JP | H1083189 | A | 3/1998 |

(Continued)

OTHER PUBLICATIONS

Notice of Reasons for Refusal for Japanese Patent Application No. 2023-130175 dated Mar. 5, 2025; 8 pp.

*Primary Examiner* — Jason R Kurr
(74) *Attorney, Agent, or Firm* — Armstrong Teasdale LLP

(57) ABSTRACT

An active noise reduction system includes a canceling sound output device configured to output a canceling sound, an error microphone configured to generate an error signal, and a controller configured to control the canceling sound output device based on the error signal. The controller includes a control filter configured to generate a control signal for controlling the canceling sound output device, and a secondary path filter that represents an estimation value of a transfer function of a secondary path from the canceling sound output device to the error microphone. The active noise reduction system further includes a reference microphone provided separately from the error microphone, the reference microphone is configured to generate a determination signal based on at least a noise, and the controller is configured to determine whether the transfer function of the secondary path has changed based on the error signal and the determination signal.

7 Claims, 8 Drawing Sheets

(56) References Cited

U.S. PATENT DOCUMENTS

| | | | | |
|---|---|---|---|---|
| 11,483,653 | B2 | 10/2022 | Hayashi et al. | |
| 2010/0014685 | A1* | 1/2010 | Wurm .............. | G10K 11/17823 381/71.11 |
| 2010/0195844 | A1* | 8/2010 | Christoph ........ | G10K 11/17817 381/71.11 |
| 2010/0290635 | A1* | 11/2010 | Shridhar .......... | G10K 11/17854 381/71.1 |

FOREIGN PATENT DOCUMENTS

| | | | |
|---|---|---|---|
| JP | 2011148401 | A | 8/2011 |
| JP | 2018527625 | A | 9/2018 |
| JP | 2021009362 | A | 1/2021 |
| JP | 2021081503 | A | 5/2021 |

* cited by examiner

ACTIVE NOISE REDUCTION SYSTEM

TECHNICAL FIELD

The present invention relates to an active noise reduction system that reduces a noise by causing a canceling sound that is in an opposite phase to the noise to interfere with the noise.

BACKGROUND ART

In recent years, taking into account people in vulnerable situations such as the elderly and children among traffic participants, efforts have been actively made to provide access to sustainable transportation systems for such people. Toward its realization, research and development for further improving the safety and convenience of traffic through development of vehicle comfort are attracting attention.

To improve vehicle comfort, it is desirable to reduce the noise inside a vehicle. As such, research and development of an active noise reduction system, which reduces the noise by causing a canceling sound that is in an opposite phase to the noise to interfere with the noise, are actively conducted.

For example, JPH7-28474A discloses an active noise reduction system including a secondary path filter (see "a filter 14c for generating a filtered X signal" in JPH7-28474A) that represents an estimation value of a transfer function of a secondary path.

In such an active noise reduction system, when the transfer function of the secondary path changes and the difference between the transfer function of the secondary path and the secondary path filter becomes large, the noise reduction effect may be reduced or the noise may be amplified. Accordingly, there is a known technique to adaptively update the secondary path filter in a case where the transfer function of the secondary path has changed. In a case where such a technique is employed, it is necessary to accurately determine whether the transfer function of the secondary path has changed to adaptively update the secondary path filter at an appropriate timing.

SUMMARY OF THE INVENTION

In view of the above background, an object of the present invention is to provide an active noise reduction system that can accurately determine whether the transfer function of the secondary path has changed. Further, another object of the present invention is to contribute to the development of sustainable transportation systems.

To achieve such an object, one aspect of the present invention provides an active noise reduction system (1) comprising: a canceling sound output device (21) configured to output a canceling sound for canceling a noise; an error microphone (23) configured to generate an error signal (e1) based on the noise and the canceling sound; and a controller (25) configured to control the canceling sound output device based on the error signal, wherein the controller includes: a control filter (W1) configured to generate a control signal (u1) for controlling the canceling sound output device; and a secondary path filter (C^1) that represents an estimation value of a transfer function of a secondary path from the canceling sound output device to the error microphone, the active noise reduction system further comprises a reference microphone (24) provided separately from the error microphone, the reference microphone is configured to generate a determination signal (e2) based on at least the noise, and the controller is configured to determine whether the transfer function of the secondary path has changed based on the error signal and the determination signal.

According to this aspect, it is possible to accurately determine whether the transfer function of the secondary path has changed based on the error signal and the determination signal. Accordingly, it is possible to adaptively update the secondary path filter at an appropriate timing.

In the above aspect, preferably, the active noise reduction system further comprises a second canceling sound output device (22) provided separately from the canceling sound output device, wherein the controller includes a second control filter (W2) configured to generate a second control signal (u2) for controlling the second canceling sound output device, and the second control filter is configured to be adaptively updated based on the determination signal.

According to this aspect, it is possible to adaptively update the second control filter using the determination signal generated by the reference microphone. Accordingly, it is possible to reduce the number of elements as compared with a case where a microphone for generating the determination signal and a microphone for generating a signal for the adaptive update of the second control filter are provided separately.

In the above aspect, preferably, the controller includes a second secondary path filter (C^2) that represents an estimation value of a transfer function of a second secondary path from the second canceling sound output device to the reference microphone, and the controller is configured to determine whether the transfer function of the second secondary path has changed based on the error signal and the determination signal.

According to this aspect, it is possible to determine not only whether the transfer function of the secondary path has changed but also whether the transfer function of the second secondary path has changed based on the error signal and the determination signal. Accordingly, it is possible to reduce the number of elements as compared with a case where a signal for determining a change in the transfer function of the secondary path and a signal for determining a change in the transfer function of the second secondary path are generated by separate components.

In the above aspect, preferably, the controller is configured to determine that the transfer function of the secondary path has changed in a case where a difference between the error signal and the determination signal is equal to or greater than a first reference value and a temporal variation of the error signal is equal to or greater than a second reference value, and determine that the transfer function of the second secondary path has changed in a case where the difference between the error signal and the determination signal is equal to or greater than the first reference value and a temporal variation of the determination signal is equal to or greater than the second reference value.

According to this aspect, it is possible to easily determine whether the transfer function of the secondary path has changed and whether the transfer function of the second secondary path has changed based on the error signal and the determination signal. Accordingly, it is possible to reduce the calculation load on the controller.

In the above aspect, preferably, the controller is configured to determine that the transfer function of the secondary path has changed in a case where a difference between the error signal and the determination signal is equal to or greater than a first reference value and a temporal variation in the error signal is equal to or greater than a second reference value.

According to this aspect, it is possible to determine whether the transfer function of the secondary path has changed based on not only the difference between the error signal and the determination signal but also the temporal variation in the error signal. Accordingly, it is possible to avoid erroneously determining that the transfer function of the secondary path from the canceling sound output device to the error microphone has changed even though the transfer function of the secondary path from the canceling sound output device to the reference microphone has changed. Further, it is possible to easily determine whether the transfer function of the secondary path has changed based on the difference between the error signal and the determination signal and the temporal variation in the error signal. Accordingly, it is possible to reduce the calculation load on the controller as compared with the case of determining whether the transfer function of the secondary path has changed based on the similarity between the error signal and the determination signal.

In the above aspect, preferably, the controller is configured to determine that the transfer function of the secondary path has changed in a case where the difference between the error signal and the determination signal is equal to or greater than the first reference value, the temporal variation in the error signal is equal to or greater than the second reference value, and the error signal is equal to or greater than a third reference value.

Even in a state where the transfer function of the secondary path does not change, the error signal may change slightly. In the case of determining the change in the transfer function of the secondary path using only the first reference value and the second reference value, the second reference value needs to be increased to eliminate the above-mentioned slight change in the error signal. However, if the second reference value is increased in this way, the accuracy of determining the change in the transfer function of the secondary path may decrease. According to the above aspect, it is possible to eliminate the above-mentioned slight change in the error signal without increasing the second reference value by determining the change in the transfer function of the secondary path using the third reference value in addition to the first reference value and the second reference value. Accordingly, it is possible to determine the change in the transfer function of the secondary path with high accuracy.

In the above aspect, preferably, the active noise reduction system further comprises a second canceling sound output device (22) provided separately from the canceling sound output device, wherein the controller includes a second secondary path filter (C^2) that represents an estimation value of a transfer function of a second secondary path from the second canceling sound output device to the reference microphone.

According to this aspect, it is possible to use the reference microphone to control the second canceling sound output device. Accordingly, it is possible to reduce the number of elements as compared with the case of controlling the second canceling sound output device using a microphone other than the reference microphone.

Thus, according to the above aspects, it is possible to provide an active noise reduction system that can accurately determine whether the transfer function of the secondary path has changed.

BRIEF DESCRIPTION OF THE DRAWING(S)

DETAILED DESCRIPTION OF THE INVENTION

Figure 1:
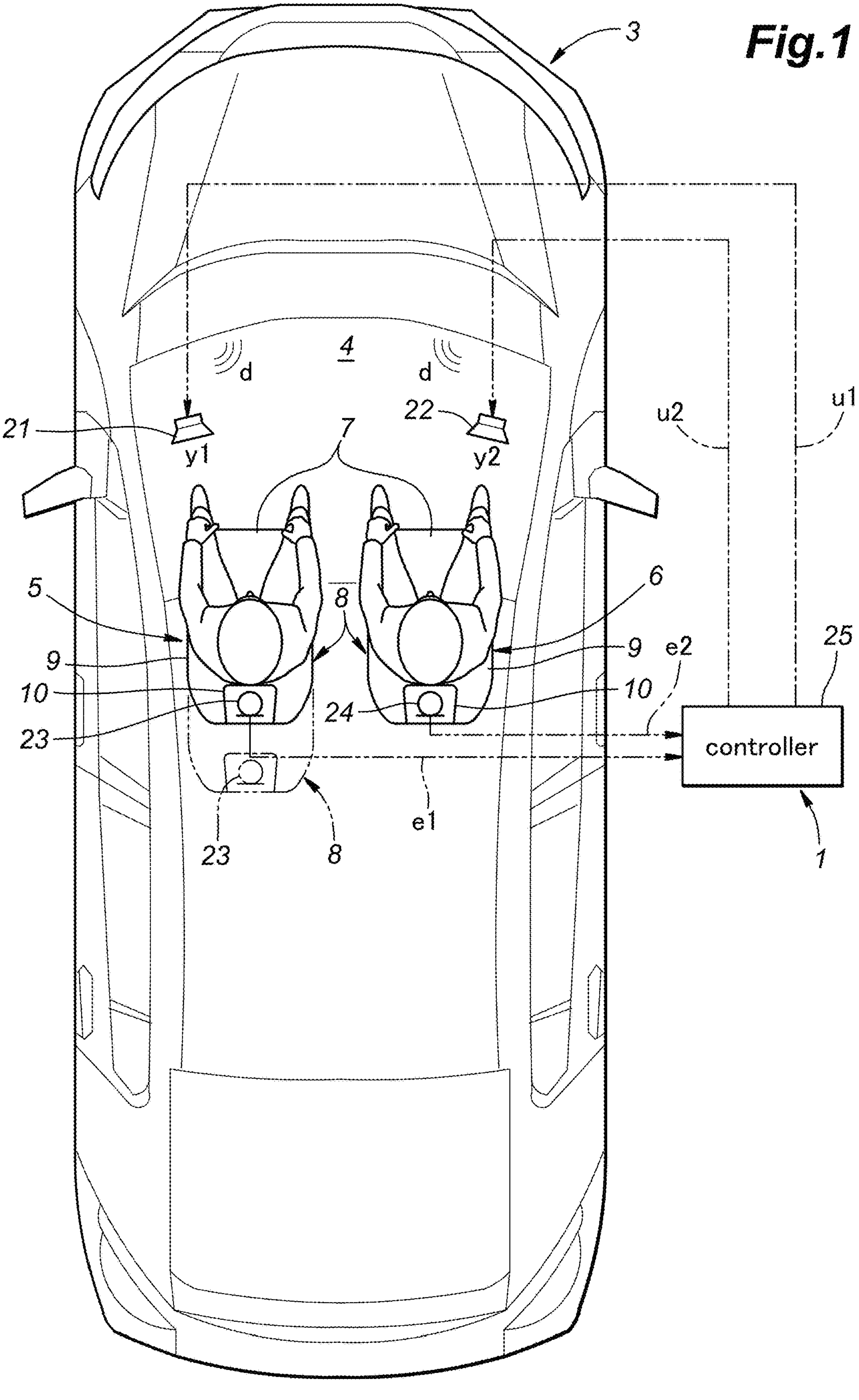
FIG. 1 is a schematic diagram showing a vehicle to which an active noise reduction system according to an embodiment is applied.

In the following, an embodiment of the present invention will be described with reference to the drawings. Note that in the following description, "^" (circumflex) added to various symbols indicates an identified value or an estimated value. "^" is added above each symbol in the drawings, but is added after each symbol in the description.

<Vehicle 3>

FIG. 1 is a schematic diagram showing a vehicle 3 to which an active noise reduction system 1 (hereinafter referred to as "the noise reduction system 1") according to the embodiment is applied. The vehicle 3 is, for example, a four-wheeled automobile.

Inside a vehicle cabin 4 of the vehicle 3, a plurality of occupant seats 5, 6 is arranged. The plurality of occupant seats 5, 6 includes a first occupant seat 5 and a second occupant seat 6. For example, the first occupant seat 5 is a passenger seat, and the second occupant seat 6 is a driver's seat. In another embodiment, a seat (for example, a driver's seat or a back seat) other than a passenger seat may be the first occupant seat 5, and a seat (for example, a passenger seat or a back seat) other than a driver's seat may be the second occupant seat 6. In other words, the combination of the first occupant seat 5 and the second occupant seat 6 can be freely determined.

Each occupant seat 5, 6 (hereinafter simply referred to as "the occupant seat 5, 6") includes a seat cushion 7 and a reclining portion 8 arranged above and behind the seat cushion 7 and configured to rotate relative to the seat cushion 7. The reclining portion 8 includes a seat back 9 and a headrest 10 fixed to an upper end of the seat back 9.

The front-and-rear position of the occupant seat 5, 6, the height of the occupant seat 5, 6, and the inclination angle of the reclining portion 8 of the occupant seat 5, 6 are adjusted by an electric motor (not shown) according to an operation on a seat position operation unit (not shown) by the occupant. In other words, the occupant seat 5, 6 is the so-called power seat.

<Noise Reduction System 1>

The noise reduction system 1 is an Active Noise Control device (ANC device) configured to reduce a noise d generated inside the vehicle cabin 4 of the vehicle 3. More specifically, the noise reduction system 1 reduces the noise d by generating canceling sounds y1, y2 that are in an opposite phase to the noise d and causing the generated canceling sounds y1, y2 to interfere with the noise d.

For example, the noise d to be reduced by the noise reduction system 1 is a road noise caused by the vibrations of wheels due to the force from a road surface. The noise d to be reduced by the noise reduction system 1 may be a noise (for example, a drive noise caused by the vibrations of a drive source such as an internal combustion engine and an electric motor) other than the above-mentioned road noise.

The noise reduction system 1 includes a plurality of speakers 21, 22 configured to output the canceling sounds y1, y2 for canceling the noise d, a plurality of microphones 23, 24 configured to generate error signals e1, e2 based on the noise d and the canceling sounds y1, y2, and a controller 25 configured to control the plurality of speakers 21, 22 based on the error signals e1, e2.

<The Plurality of Speakers 21, 22>

The plurality of speakers 21, 22 includes a first speaker 21 (an example of a canceling sound output device) configured to output the canceling sound y1, and a second speaker 22 (an example of a second canceling sound output device) configured to output the canceling sound y2. The second speaker 22 is provided separately from the first speaker 21.

The first speaker 21 is arranged at a position corresponding to the first occupant seat 5 but installed in a portion other than the first occupant seat 5. For example, the first speaker 21 is installed on a floor in front of the first occupant seat 5 or in a door on a lateral side of the first occupant seat 5. In another embodiment, the first speaker 21 may be installed in the first occupant seat 5.

The second speaker 22 is arranged at a position corresponding to the second occupant seat 6 but installed in a portion other than the second occupant seat 6. For example, the second speaker 22 is installed on a floor in front of the second occupant seat 6 or in a door on a lateral side of the second occupant seat 6. In another embodiment, the second speaker 22 may be installed in the second occupant seat 6.

<The Plurality of Microphones 23, 24>

The plurality of microphones 23, 24 includes a first microphone 23 (an example of an error microphone) and a second microphone 24 (an example of a reference microphone). The second microphone 24 is provided separately from the first microphone 23.

The first microphone 23 is installed in a freely-selected portion of the first occupant seat 5. For example, the first microphone 23 is installed in the headrest 10 of the reclining portion 8 of the first occupant seat 5. In another embodiment, the first microphone 23 may be arranged at a position corresponding to the first occupant seat 5 but installed in a portion other than the first occupant seat 5.

Figure 2:
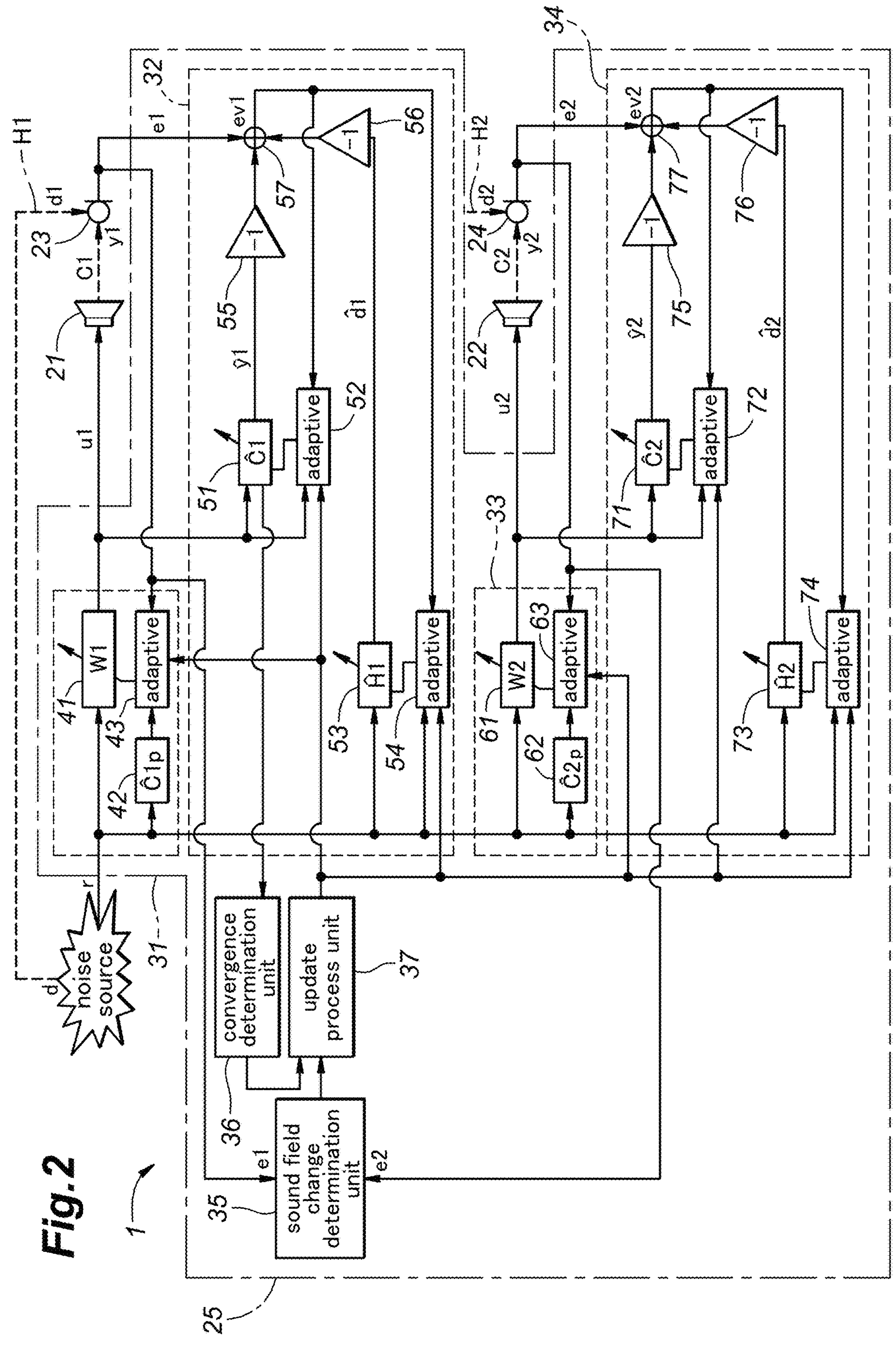
FIG. 2 is a functional block diagram showing the active noise reduction system according to the embodiment.

With reference to FIG. 2, the first microphone 23 is configured to generate the error signal e1 based on the canceling sound y1, the canceling sound y2, and a noise d1 (the noise d at the position of the first microphone 23). In another embodiment, the first microphone 23 may be configured to generate the error signal e1 based only on the canceling sound y1 and the noise d1.

With reference to FIG. 1, the second microphone 24 is installed in a freely-selected portion of the second occupant seat 6. For example, the second microphone 24 is installed in the headrest 10 of the reclining portion 8 of the second occupant seat 6. In another embodiment, the second microphone 24 may be arranged at a position corresponding to the second occupant seat 6 but installed in a portion other than the second occupant seat 6.

With reference to FIG. 2, the second microphone 24 is configured to generate the error signal e2 (an example of a determination signal) based on the canceling sound y1, the canceling sound y2, and a noise d2 (the noise d at the position of the second microphone 24). In another embodiment, the second microphone 24 may be configured to generate the error signal e2 based only on the canceling sound y2 and the noise d2.

"C1" in FIG. 2 represents a transfer function of a secondary path from the first speaker 21 to the first microphone 23, and "H1" in FIG. 2 represents a transfer function of a primary path from a noise source to the first microphone 23. Similarly, "C2" in FIG. 2 represents a transfer function of a secondary path from the second speaker 22 to the second microphone 24, and "H2" in FIG. 2 represents a transfer function of a primary path from the noise source to the second microphone 24. These transfer functions C1, H1, C2, and H2 correspond to a sound field inside the vehicle cabin 4.

<Controller 25>

The controller 25 is composed of a computer including an arithmetic processing unit (a processor such as a CPU, an MPU, etc.) and a storage device (a memory such as a ROM, a RAM, etc.). The controller 25 may be configured as one piece of hardware or may be configured as a unit including multiple pieces of hardware.

A reference signal r corresponding to the noise d is input to the controller 25. The reference signal r is input to the controller 25, for example, from a reference microphone (not shown) that generates the reference signal r from the noise d. In another embodiment, the reference signal r may be input to the controller 25 from a vibration sensor (not shown) that detects the vibrations corresponding to the noise d, or from a component other than the reference microphone or the vibration sensor.

With reference to FIG. 2, the controller 25 includes, as functional components, a first control signal generation unit 31, a first sound field learning unit 32, a second control signal generation unit 33, a second sound field learning unit 34, a sound field change determination unit 35, a convergence determination unit 36, and an update process unit 37. The first control signal generation unit 31 and the first sound field learning unit 32 correspond to the first speaker 21 and the first microphone 23. The second control signal generation unit 33 and the second sound field learning unit 34 correspond to the second speaker 22 and the second microphone 24.

<First Control Signal Generation Unit 31>

The first control signal generation unit 31 of the controller 25 includes a first control filter unit 41, a first auxiliary secondary path filter unit 42, and a first control update unit 43.

The first control filter unit 41 includes a control filter W1. The control filter W1 is composed of a finite impulse response filter (FIR filter). In another embodiment, the control filter W1 may be composed of a single-frequency adaptive notch filter (SAN filter) and the like.

As the control filter W1 of the first control filter unit 41 filters the reference signal r, the first control filter unit 41 generates a control signal u1 for controlling the first speaker 21. The first control filter unit 41 outputs the generated control signal u1 to the first speaker 21 and the first sound field learning unit 32. Accordingly, the first speaker 21 generates the canceling sound y1 according to the control signal u1 output from the first control filter unit 41.

The first auxiliary secondary path filter unit 42 includes an auxiliary secondary path filter C^1*p*. The auxiliary secondary path filter C^1*p* is a filter that represents an estimation value of the transfer function C1 of the secondary path. The auxiliary secondary path filter C^1*p* is composed of an FIR filter. In another embodiment, the auxiliary secondary path filter C^1*p* may be composed of a SAN filter and the like.

As the auxiliary secondary path filter C^1*p* of the first auxiliary secondary path filter unit 42 filters the reference signal r, the first auxiliary secondary path filter unit 42 corrects the reference signal r. The first auxiliary secondary path filter unit 42 outputs the corrected reference signal r to the first control update unit 43.

The first control update unit 43 adaptively updates the control filter W1 using an adaptive algorithm such as a least mean square algorithm (LMS algorithm). More specifically, the first control update unit 43 adaptively updates the control filter W1 such that the error signal e1 output from the first microphone 23 is minimized.

<First Sound Field Learning Unit 32>

The first sound field learning unit 32 of the controller 25 includes a first canceling sound estimation signal generation unit 51, a first secondary path update unit 52, a first noise estimation signal generation unit 53, a first primary path update unit 54, a first canceling sound estimation signal reversing unit 55, a first noise estimation signal reversing unit 56, and a first virtual error signal generation unit 57.

The first canceling sound estimation signal generation unit 51 includes a secondary path filter C^1. The secondary path filter C^1, similar to the auxiliary secondary path filter C^1_p_, is a filter that represents the estimation value of the transfer function C1 of the secondary path. The secondary path filter C^1 is composed of, for example, an FIR filter. In another embodiment, the secondary path filter C^1 may be composed of a SAN filter and the like.

As the secondary path filter C^1 of the first canceling sound estimation signal generation unit 51 filters the control signal u1, the first canceling sound estimation signal generation unit 51 generates a canceling sound estimation signal y^1 that represents an estimation value of the canceling sound y1. The first canceling sound estimation signal generation unit 51 outputs the generated canceling sound estimation signal y^1 to the first canceling sound estimation signal reversing unit 55.

The first secondary path update unit 52 adaptively updates the secondary path filter C^1 using an adaptive algorithm such as the LMS algorithm. More specifically, the first secondary path update unit 52 adaptively updates the secondary path filter C^1 such that a virtual error signal ev1 (which will be described later) output from the first virtual error signal generation unit 57 is minimized.

The first noise estimation signal generation unit 53 includes a primary path filter H^1. The primary path filter H^1 is a filter that represents an estimation value of the transfer function H1 of the primary path. The primary path filter H^1 is composed of, for example, an FIR filter. In another embodiment, the primary path filter H^1 may be composed of a SAN filter and the like.

As the primary path filter H^1 of the first noise estimation signal generation unit 53 filters the reference signal r, the first noise estimation signal generation unit 53 generates a noise estimation signal d^1 that represents an estimation value of the noise d1. The first noise estimation signal generation unit 53 outputs the generated noise estimation signal d^1 to the first noise estimation signal reversing unit 56.

The first primary path update unit 54 adaptively updates the primary path filter H^1 using an adaptive algorithm such as the LMS algorithm. More specifically, the first primary path update unit 54 adaptively updates the primary path filter H^1 such that the virtual error signal ev1 (which will be described later) output from the first virtual error signal generation unit 57 is minimized.

The first canceling sound estimation signal reversing unit 55 reverses the polarity of the canceling sound estimation signal y^1 output from the first canceling sound estimation signal generation unit 51. The first canceling sound estimation signal reversing unit 55 outputs the canceling sound estimation signal y^1 the polarity of which is reversed to the first virtual error signal generation unit 57.

The first noise estimation signal reversing unit 56 reverses the polarity of the noise estimation signal d^1 output from the first noise estimation signal generation unit 53. The first noise estimation signal reversing unit 56 outputs the noise estimation signal d^1 the polarity of which is reversed to the first virtual error signal generation unit 57.

The first virtual error signal generation unit 57 generates the virtual error signal ev1 by adding the error signal e1 output from the first microphone 23, the canceling sound estimation signal y^1 that has passed through the first canceling sound estimation signal reversing unit 55, and the noise estimation signal d^1 that has passed through the first noise estimation signal reversing unit 56. The first virtual error signal generation unit 57 outputs the generated virtual error signal ev1 to the first secondary path update unit 52 and the first primary path update unit 54.

<Second Control Signal Generation Unit 33>

The second control signal generation unit 33 of the controller 25 is provided separately from the first control signal generation unit 31. The second control signal generation unit 33 includes a second control filter unit 61, a second auxiliary secondary path filter unit 62, and a second control update unit 63.

As a control filter W2 (an example of a second control filter) of the second control filter unit 61 filters the reference signal r, the second control filter unit 61 generates a control signal u2 (an example of a second control signal) for controlling the second speaker 22. The second auxiliary secondary path filter unit 62 includes an auxiliary secondary path filter C^2_p_ that represents an estimation value of the transfer function C2 of the secondary path. The auxiliary secondary path filter C^2_p_ corrects the reference signal r, and the second auxiliary secondary path filter unit 62 outputs the corrected reference signal r to the second control update unit 63. The second control update unit 63 adaptively updates the control filter W2 such that the error signal e2 output from the second microphone 24 is minimized.

<Second Sound Field Learning Unit 34>

The second sound field learning unit 34 of the controller 25 is provided separately from the first sound field learning unit 32. The second sound field learning unit 34 includes a second canceling sound estimation signal generation unit 71, a second secondary path update unit 72, a second noise estimation signal generation unit 73, a second primary path update unit 74, a second canceling sound estimation signal reversing unit 75, a second noise estimation signal reversing unit 76, and a second virtual error signal generation unit 77.

The second canceling sound estimation signal generation unit 71 includes a secondary path filter C^2 (an example of a second secondary path filter) that represents an estimation value of the transfer function C2 of the secondary path. As the secondary path filter C^2 filters the control signal u2, the second canceling sound estimation signal generation unit 71 generates a canceling sound estimation signal y^2 that represents an estimation value of the canceling sound y2. The second secondary path update unit 72 adaptively updates the secondary path filter C^2 such that a virtual error signal ev2 (which will be described later) is minimized.

The second noise estimation signal generation unit 73 includes a primary path filter H^2 that represents an estimation value of the transfer function H2 of the primary path. As the primary path filter H^2 filters the reference signal r, the second noise estimation signal generation unit 73 generates a noise estimation signal d^2 that represents an estimation value of the noise d2. The second primary path update unit 74 adaptively updates the primary path filter H^2 such that the virtual error signal ev2 (which will be described later) is minimized.

The second canceling sound estimation signal reversing unit 75 reverses the polarity of the canceling sound estimation signal y^2. The second noise estimation signal reversing unit 76 reverses the polarity of the noise estimation signal d^2. The second virtual error signal generation unit 77 generates the virtual error signal ev2 by adding the error signal e2 output from the second microphone 24, the canceling sound estimation signal y^2 that has passed through the second canceling sound estimation signal reversing unit 75, and the noise estimation signal d^2 that has passed through the second noise estimation signal reversing unit 76.

<Sound Field Change Determination Unit 35>

The sound field change determination unit 35 of the controller 25 determines whether the transfer function C1 of the secondary path has changed based on the error signal e1 and the error signal e2. The determination method of the sound field change determination unit 35 will be described later.

<Convergence Determination Unit 36>

The convergence determination unit 36 of the controller 25 determines whether the fluctuation of the secondary path filter C^1 according to the adaptive update thereof has converged based on the secondary path filter C^1. The determination method of the convergence determination unit 36 will be described later.

<Update Process Unit 37>

The update process unit 37 of the controller 25 determines the order and timing of the adaptive updates of the filters based on the determination results of the sound field change determination unit 35 and the convergence determination unit 36. The determination method of the update process unit 37 will be described later.

<Sound Field Change Determination Process>

Next, a sound field change determination process performed by the sound field change determination unit 35 will be described. The sound field change determination process is a process for determining whether the transfer function C1 of the secondary path has changed.

Figure 3:
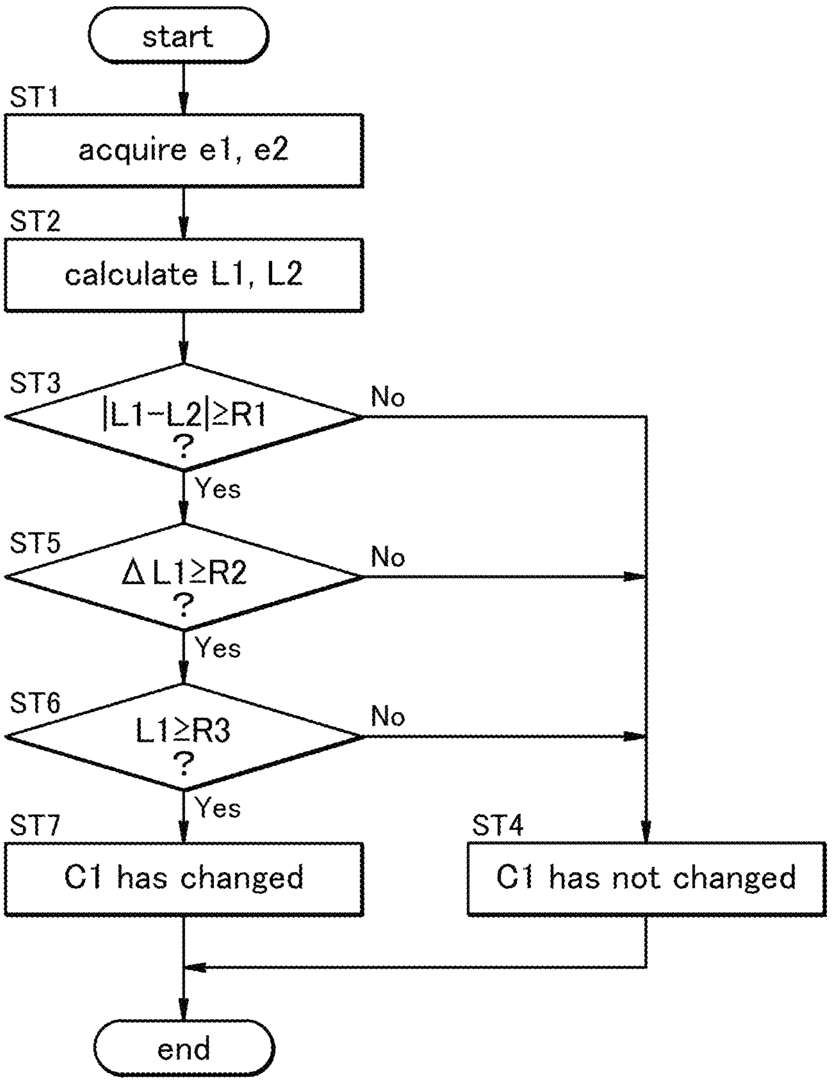
FIG. 3 is a flowchart showing a sound field change determination process according to the embodiment.

With reference to FIG. 3, when the sound field change determination process starts, the sound field change determination unit 35 acquires the error signal e1 from the first microphone 23 and acquires the error signal e2 from the second microphone 24 (step ST1).

Next, the sound field change determination unit 35 calculates a signal level L1 of the error signal e1 and a signal level L2 of the error signal e2 (step ST2). For example, the sound field change determination unit 35 may determine the sum of the squares of the error signal e1 within a certain period as the signal level L1 of the error signal e1, or determine the sum of the absolute values of the error signal e1 within a certain period as the signal level L1 of the error signal e1. The same method can be applied to the signal level L2 of the error signal e2.

Next, the sound field change determination unit 35 determines whether the absolute value of the difference between the signal level L1 of the error signal e1 and the signal level L2 of the error signal e2 is equal to or more than a first reference value R1 (step ST3). In a case where the absolute value of the difference between the signal level L1 of the error signal e1 and the signal level L2 of the error signal e2 is less than the first reference value R1 (step ST3: No), the sound field change determination unit 35 determines that the transfer function C1 of the secondary path has not changed (step ST4).

In a case where the absolute value of the difference between the signal level L1 of the error signal e1 and the signal level L2 of the error signal e2 is equal to or greater than the first reference value R1 (step ST3: Yes), the sound field change determination unit 35 determines whether a temporal variation ΔL1 of the signal level L1 of the error signal e1 (for example, the difference between the current value of the signal level L1 of the error signal e1 and the previous value of the signal level L1 of the error signal e1) is equal to or greater than a second reference value R2 (step ST5). In a case where the temporal variation ΔL1 of the signal level L1 of the error signal e1 is less than the second reference value R2 (step ST5: No), the sound field change determination unit 35 determines that the transfer function C1 of the secondary path has not changed (step ST4).

In a case where the temporal variation ΔL1 of the signal level L1 of the error signal e1 is equal to or greater than the second reference value R2 (step ST5: Yes), the sound field change determination unit 35 determines whether the signal level L1 of the error signal e1 is equal to or greater than a third reference value R3 (step ST6). In a case where the signal level L1 of the error signal e1 is less than the third reference value R3 (step ST6: No), the sound field change determination unit 35 determines that the transfer function C1 of the secondary path has not changed (step ST4). In a case where the signal level L1 of the error signal e1 is equal to or greater than the third reference value R3 (step ST6: Yes), the sound field change determination unit 35 determines that the transfer function C1 of the secondary path has changed (step ST7).

As shown by a two-dot chain line in FIG. 1, when the reclining portion 8 of the first occupant seat 5 is reclined, the position of the first microphone 23 installed in the reclining portion 8 of the first occupant seat 5 changes. Accordingly, the transfer function C1 of the secondary path changes, and the difference between the transfer function C1 of the secondary path and the secondary path filter C^1 temporarily increases. Accordingly, the control effect of the noise reduction system 1 temporarily decreases, and the signal level L1 of the error signal e1 increases.

Figure 4:
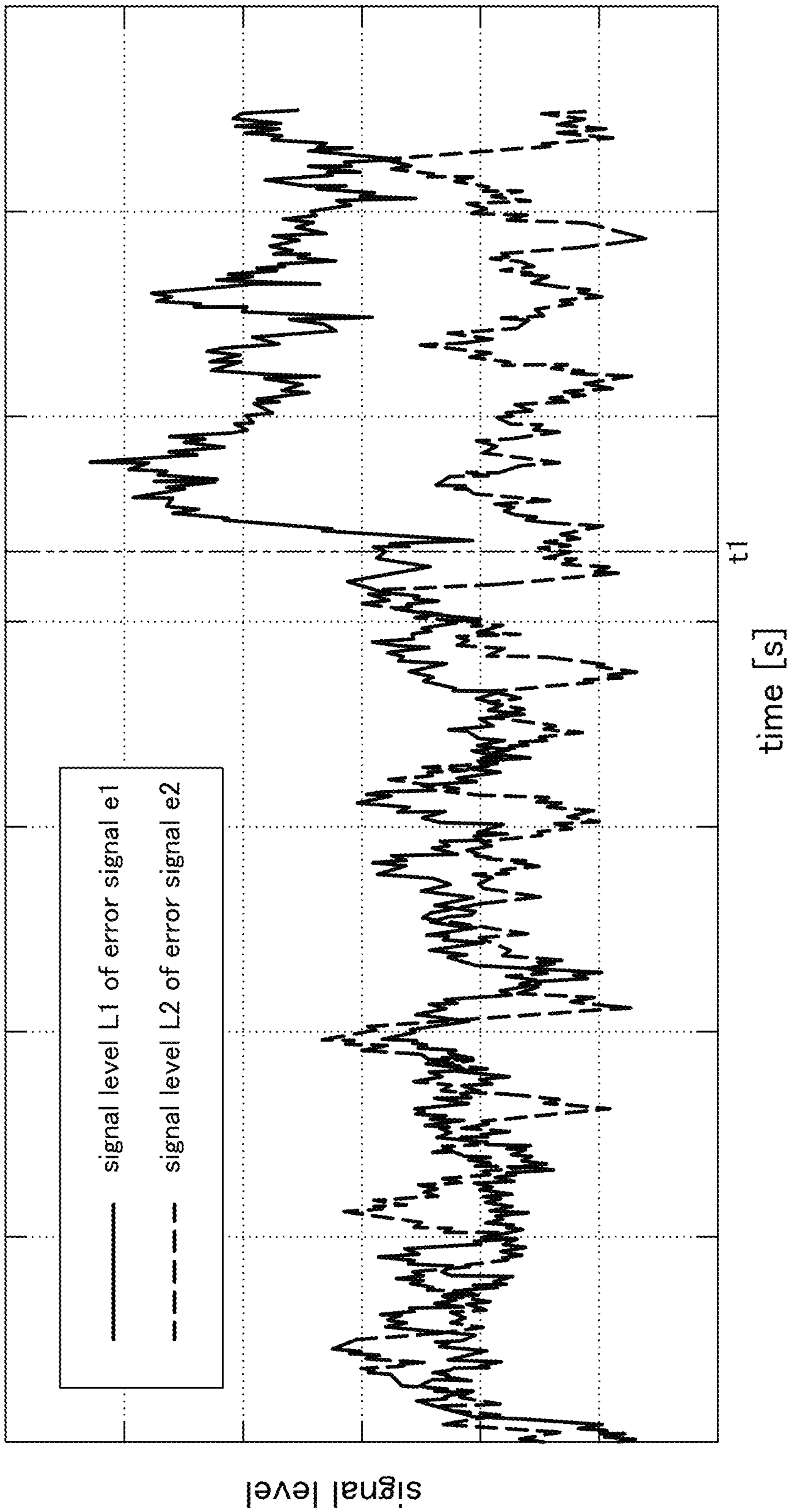
FIG. 4 is a graph showing a signal level of an error signal according to the embodiment.

With reference to FIG. 4, for example, when the reclining portion 8 of the first occupant seat 5 is reclined at time T1, the signal level L1 of the error signal e1 increases significantly relative to the signal level L2 of the error signal e2. Accordingly, all of the determinations in steps ST3, ST5, and ST6 become "Yes". Accordingly, the sound field change determination unit 35 can determine that the transfer function C1 of the secondary path has changed.

Further, the sound field change determination unit 35 can determine whether the transfer function C2 of the secondary path has changed by a process similar to the above-mentioned sound field change determination process based on the error signal e1 and the error signal e2. For example, the sound field change determination unit 35 determines that the transfer function C2 of the secondary path has changed in a case where the absolute value of the difference between the signal level L1 of the error signal e1 and the signal level L2 of the error signal e2 is equal to or greater than the first reference value R1, the temporal variation ΔL2 of the signal level L2 of the error signal e2 is equal to or greater than the second reference value R2, and the signal level L2 of the error signal e2 is equal to or greater than the third reference value R3. Otherwise, the sound field change determination unit 35 determines that the transfer function C2 of the secondary path has not changed.

<Convergence Determination Process>

Next, the convergence determination process performed by the convergence determination unit 36 will be described. The convergence determination process is a process for determining whether the fluctuation of the secondary path filter C^1 according to the adaptive update thereof (hereinafter, referred to as "the fluctuation of the secondary path filter C^1") has converged.

Figure 5:
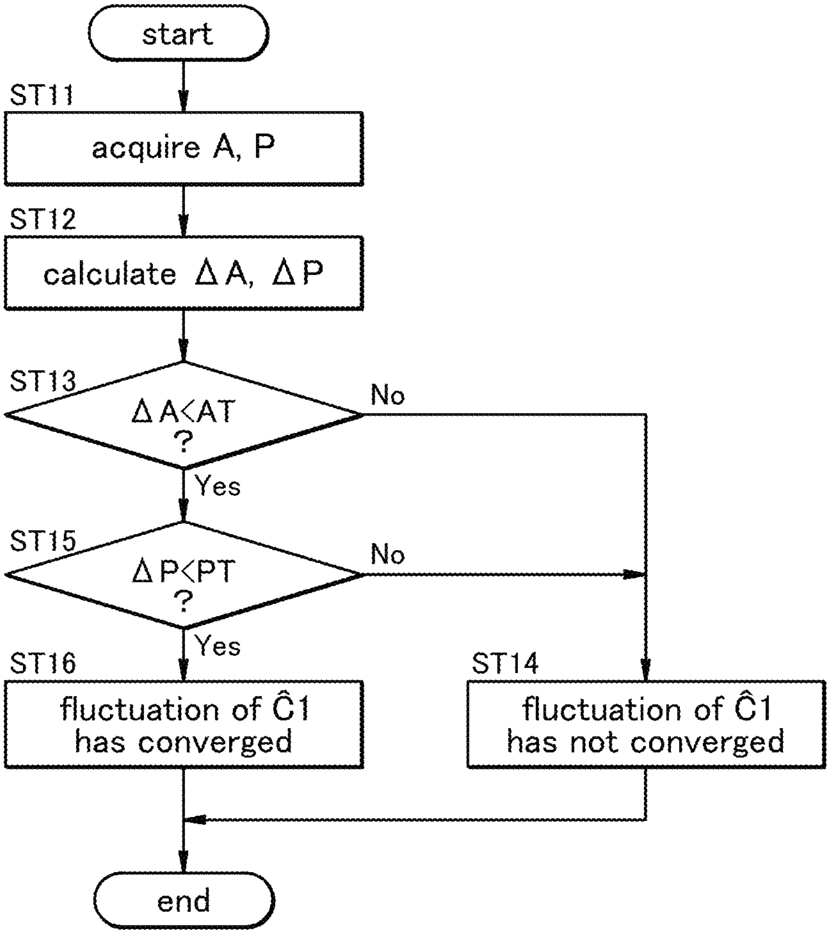
FIG. 5 is a flowchart showing a convergence determination process according to the embodiment.
Figure 6:
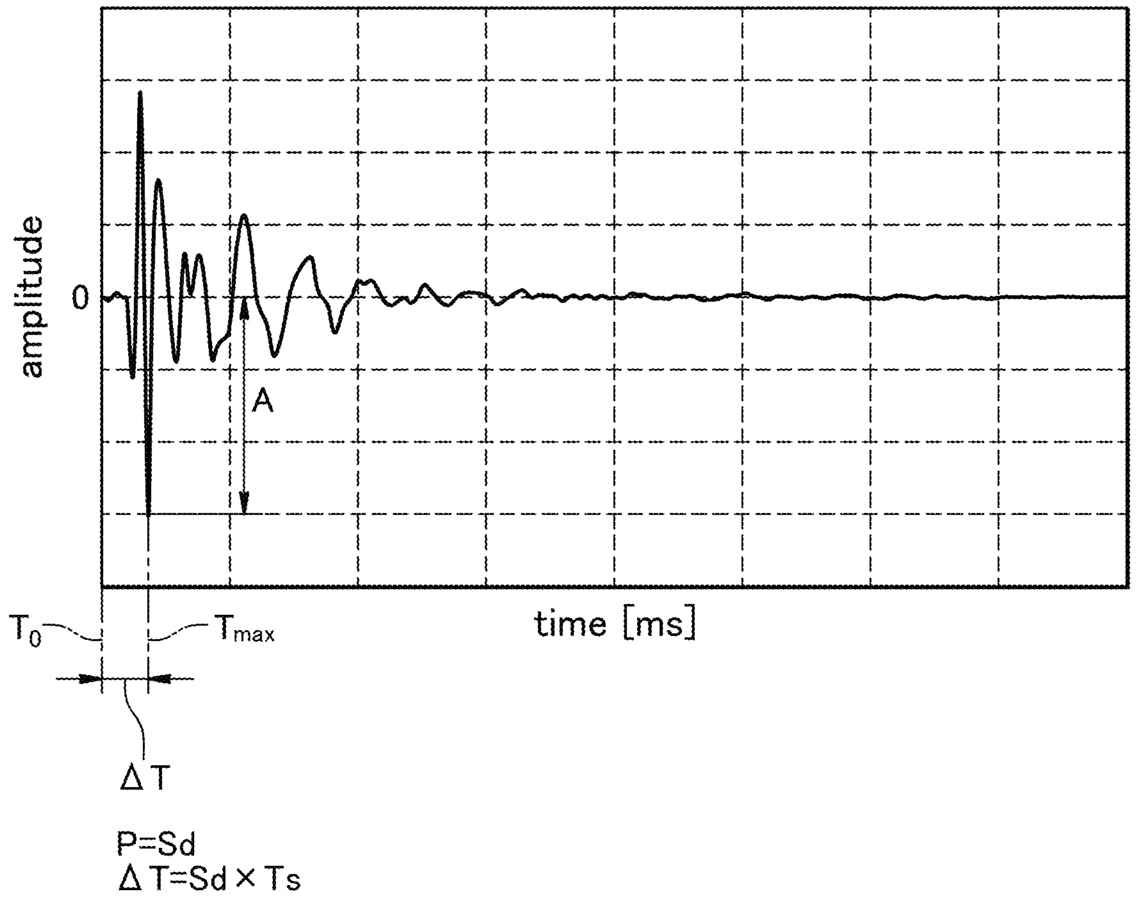
FIG. 6 is a graph showing an impulse response of a secondary path filter according to the embodiment.

With reference to FIGS. 5 and 6, when the convergence determination process starts, the convergence determination unit 36 acquires an amplitude A and a phase P of the secondary path filter C^1 (step ST11). For example, the convergence determination unit 36 acquires the maximum value of the amplitude of the impulse response of the secondary path filter C^1 as the amplitude A of the secondary path filter C^1. Further, the convergence determination unit 36 acquires a delay sample number Sd, which corresponds to the maximum value of the amplitude of the impulse response of the secondary path filter C^1, as the phase P of the secondary path filter C^1. A delay time ΔT (the time from a time $T_0$ when the first speaker 21 outputs the canceling sound y1 to a time $T_{max}$ when the amplitude of the impulse response of the secondary path filter C^1 becomes maximum) is calculated by multiplying the delay sample number Sd by a sampling time Ts. That is, the convergence determination unit 36 uses the delay sample number Sd corresponding to the delay time ΔT as the phase P of the secondary path filter C^1.

Next, the convergence determination unit 36 calculates the variation ΔA of the amplitude A of the secondary path filter C^1 (for example, the difference between the current value of the amplitude A of the secondary path filter C^1 and the previous value of the amplitude A of the secondary path filter C^1). Furthermore, the convergence determination unit 36 calculates the variation ΔP of the phase P of the secondary path filter C^1 (for example, the difference between the current value of the phase P of the secondary path filter C^1 and the previous value of the phase P of the secondary path filter C^1) (step ST12).

Next, the convergence determination unit 36 determines whether the variation ΔA of the amplitude A of the secondary path filter C^1 is less than an amplitude threshold AT (step ST13). In a case where the variation ΔA of the amplitude A of the secondary path filter C^1 is equal to or greater than the amplitude threshold AT (step ST13: No), the convergence determination unit 36 determines that the fluctuation of the secondary path filter C^1 has not converged (step ST14).

In a case where the variation ΔA of the amplitude A of the secondary path filter C^1 is less than the amplitude threshold AT (step ST13: Yes), the convergence determination unit 36 determines whether the variation ΔP of the phase P of the secondary path filter C^1 is less than a phase threshold PT (step ST15). In a case where the variation ΔP of the phase P of the secondary path filter C^1 is equal to or greater than the phase threshold PT (step ST15: No), the convergence determination unit 36 determines that the fluctuation of the secondary path filter C^1 has not converged (step ST14). In a case where the variation ΔP of the phase P of the secondary path filter C^1 is less than the phase threshold PT (step ST15: Yes), the convergence determination unit 36 determines that the fluctuation of the secondary path filter C^1 has converged (step ST16).

As described above, the convergence determination unit 36 performs the convergence determination process based on both the variation ΔA of the amplitude A and the variation ΔP of the phase P of the secondary path filter C^1. Accordingly, it is possible to accurately determine whether the fluctuation of the secondary path filter C^1 has converged as compared with a case where the convergence determination process is performed based on only one of the variation ΔA of the amplitude A and the variation ΔP of the phase P of the secondary path filter C^1.

<Update Process>

Next, an update process performed by the controller 25 will be described. The update process is a process for updating the control filter W1, the secondary path filter C^1, the primary path filter H^1, and the auxiliary secondary path filter C^1*p*.

Figure 7:
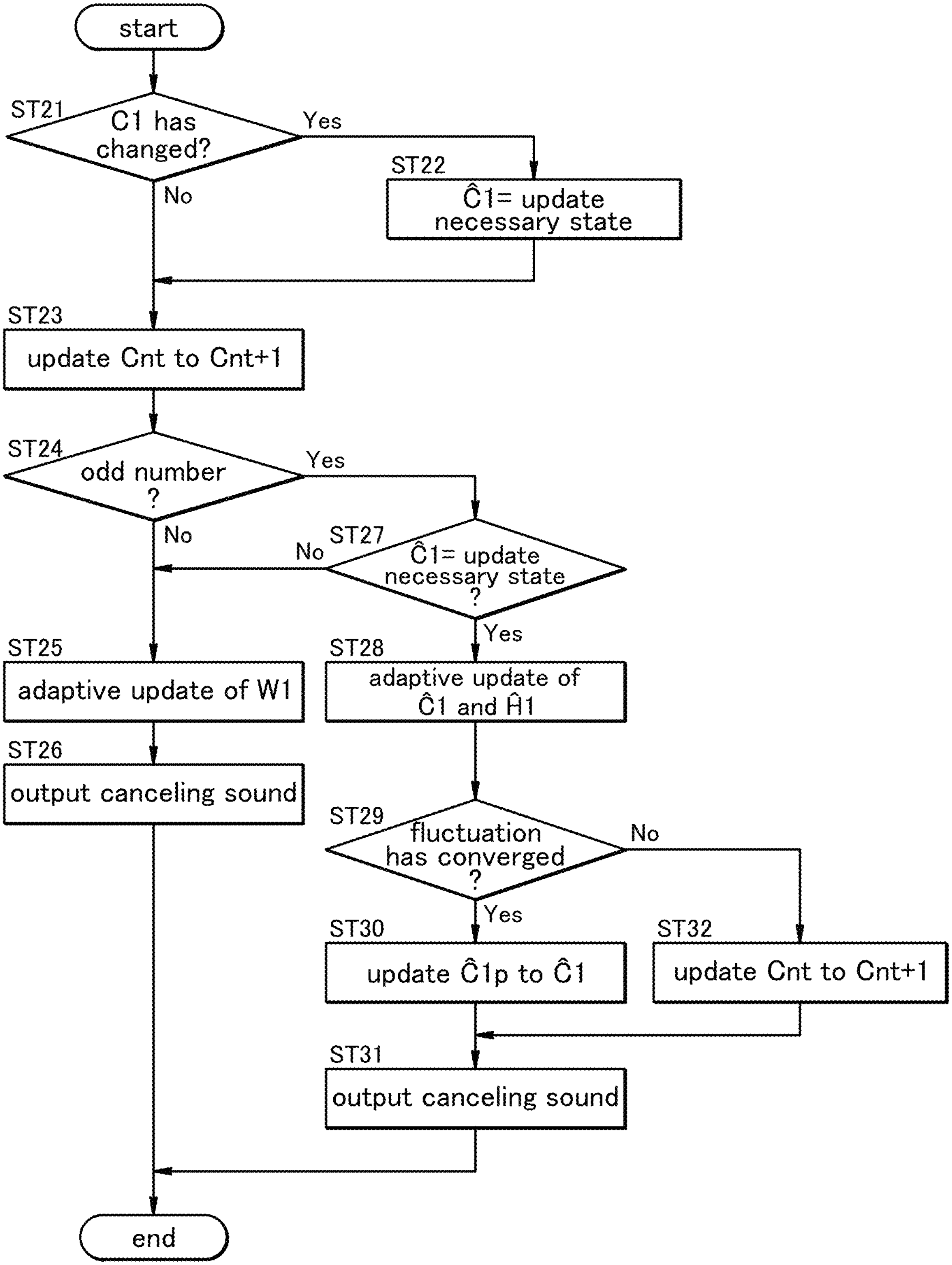
FIG. 7 is a flowchart showing an update process according to the embodiment.

With reference to FIG. 7, when the update process starts, the sound field change determination unit 35 performs the above-mentioned sound field change determination process. That is, the sound field change determination unit 35 determines whether the transfer function C1 of the secondary path has changed based on the error signal e1 and the error signal e2 (step ST21).

In a case where the transfer function C1 of the secondary path has changed (step ST21: Yes), the update process unit 37 sets the state of the secondary path filter C^1 to an update necessary state (step ST22), and proceeds to step ST23. In a case where the transfer function C1 of the secondary path has not changed (step ST21: No), the update process unit 37 proceeds to step ST23 without executing the process of step ST22.

Next, the update process unit 37 updates the number of times Cnt (initial value=0) of the update process to Cnt+1 (step ST23), and determines whether the number of times Cnt is an odd number (step ST24).

In a case where the number of times Cnt is an even number (step ST24: No), the first control update unit 43 adaptively updates the control filter W1 (step ST25). Next, the first control filter unit 41 generates the control signal u1 using the adaptively updated control filter W1, and outputs the generated control signal u1 to the first speaker 21. Accordingly, the first speaker 21 outputs the canceling sound y1 (step ST26).

In a case where the number of times Cnt is an odd number (step ST24: Yes), the update process unit 37 determines whether the state of the secondary path filter C^1 is set to the update necessary state (step ST27). In a case where the state of the secondary path filter C^1 is not set to the update necessary state (step ST27: No), the processes of steps ST25 and ST26 are performed in the same manner as a case where the number of times Cnt is an even number (step ST24: No).

In a case where the state of the secondary path filter C^1 is set to the update necessary state (step ST27: Yes), the first secondary path update unit 52 adaptively updates the secondary path filter C^1, and the first primary path update unit 54 adaptively updates the primary path filter H^1 (step ST28).

Next, the convergence determination unit 36 performs the above-mentioned convergence determination process to determine whether the fluctuation of the secondary path filter C^1 has converged (step ST29).

In a case where the fluctuation of the secondary path filter C^1 has converged (step ST29: Yes), the update process unit 37 updates the auxiliary secondary path filter C^1*p* to the value of the secondary path filter C^1 by copying the value of the secondary path filter C^1 to the auxiliary secondary path filter C^1*p* (step ST30).

Next, the first control filter unit 41 generates the control signal u1 using the temporarily fixed control filter W1 (the control filter W1 adaptively updated in the previous update process), and outputs the generated control signal u1 to the first speaker 21. Accordingly, the first speaker 21 outputs the canceling sound y1 (step ST31).

In a case where the fluctuation of the secondary path filter C^1 has not converged (step ST29: No), the update process unit 37 updates the number of times Cnt to Cnt+1 without updating the auxiliary secondary path filter C^1*p* to the value of the secondary path filter C^1 (step ST32). Next, as the above-mentioned step ST31 is performed, the first control filter unit 41 outputs the control signal u1 to the first speaker 21, and the first speaker 21 outputs the canceling sound y1.

As either step ST26 or step ST31 ends, the update process ends, and a next update process (new update process) is performed after a prescribed time. However, the value of the number of times Cnt is maintained even after the end of the update process, and is used for the next update process.

In a case where the fluctuation of the secondary path filter C^1 has not converged in the current update process (step ST29: No), the update process unit 37 sets the state of the secondary path filter C^1 to the update necessary state in the next update process (step ST22). Further, in a case where the fluctuation of the secondary path filter C^1 has not converged in the current update process (step ST29: No), as the number of times Cnt is updated twice in step ST32 of the current update process and step ST23 of the next update process, step ST24 of the next update process becomes "Yes". Accordingly, in the next update process, the secondary path filter C^1 is adaptively updated (step ST28) and whether the fluctuation of the secondary path filter C^1 has converged is determined (step ST29) in the same manner as in the current update process. In this way, in the present embodiment, the adaptive update of the secondary path filter C^1 and the determination of whether the fluctuation of the secondary path filter C^1 has converged are repeated without the adaptive update of the control filter W1 until the fluctuation of the secondary path filter C^1 converges.

The controller 25 repeatedly performs the above-mentioned update process at prescribed time intervals. In the update process, the controller 25 determines whether the fluctuation of the secondary path filter C^1 has converged (step ST29). In a case where the fluctuation of the secondary path filter C^1 has converged (step ST29: Yes), the controller 25 stops the adaptive update of the secondary path filter C^. In the next update process, the controller 25 determines whether the transfer function C1 of the secondary path has changed based on the error signal e1 and the error signal e2 in a state where the adaptive update of the secondary path filter C^1 is stopped (step ST21). In a case where the transfer function C1 of the secondary path has changed (step ST21: Yes), the controller 25 resumes the adaptive update of the secondary path filter C^1 (steps ST22, ST27, and ST28).

<Effects>

The controller 25 may determine whether the transfer function C1 of the secondary path has changed based on the external information (for example, the information about the position of the first occupant seat 5). However, if such a determination method is applied, it is impossible to determine whether the transfer function C1 of the secondary path has changed in a case where the external information cannot be received. If it is impossible to determine whether the transfer function C1 of the secondary path has changed, the controller 25 may adaptively update the secondary path filter C^1 at all times regardless of whether the transfer function C1 of the secondary path has changed. However, if such an update method is applied, the calculation load on the controller 25 becomes large. Accordingly, the controller 25 needs to be composed of an expensive processor that can withstand such a large calculation load, which may lead to an increase in the manufacturing cost of the noise reduction system 1.

In light of such a problem, the controller 25 determines whether the transfer function C1 of the secondary path has changed based on the error signal e1 and the error signal e2. Accordingly, it is possible to determine whether the transfer function C1 of the secondary path has changed even if the external information cannot be received. Further, by determining whether the transfer function C1 of the secondary path has changed, it is possible to adaptively update the secondary path filter C^1 only in a case where the transfer function C1 of the secondary path has changed. Accordingly, it is possible to reduce the calculation load on the controller 25 as compared with the case of adaptively updating the secondary path filter C^1 at all times.

The controller 25 may determine whether the transfer function C1 of the secondary path has changed based only on the error signal e1 (for example, based only on the magnitude of the error signal e1). However, if such a determination method is applied, there is a risk of erroneously determining that the transfer function C1 of the secondary path has changed even though the transfer function C2 of the secondary path has changed.

In light of such a problem, the controller 25 determines whether the transfer function C1 of the secondary path has changed based on the error signal e1 and the error signal e2. Accordingly, it is possible to accurately determine that not the transfer function C2 of the secondary path but the transfer function C1 of the secondary path has changed.

<Modifications>

In the above embodiment, the convergence determination unit 36 performs the convergence determination process based on both the variation ΔA of the amplitude A and the variation ΔP of the phase P of the secondary path filter C^1. In another embodiment, the convergence determination unit 36 may perform the convergence determination process based on only one of the variation ΔA of the amplitude A and the variation ΔP of the phase P of the secondary path filter C^1.

In the above embodiment, the convergence determination unit 36 acquires the maximum value of the amplitude of the impulse response of the secondary path filter C^1 as the amplitude A of the secondary path filter C^1 (step ST11). In another embodiment, the convergence determination unit 36 may calculate the amplitude A of the secondary path filter C^1 by the following formula (1). In the following formula (1), "L" represents the total number of coefficients of the secondary path filter C^1, and "n" represents the number of the coefficient of the secondary path filter C^1.

$$A(t) = \sum_{n=1}^{L} \left| \hat{C}1(t)_n \right| \tag{1}$$

By using the above formula (1), the amplitude A of the secondary path filter C^1 can be calculated more accurately.

In the above embodiment, the convergence determination unit 36 determines whether the variation ΔA of the amplitude A of the secondary path filter C^1 is less than the amplitude threshold AT (step ST13). In another embodiment, the convergence determination unit 36 may determine whether the state where the variation ΔA of the amplitude A of the secondary path filter C^1 is less than the amplitude threshold AT continues for a prescribed period. Alternatively, the convergence determination unit 36 may determine whether the ratio of the current value of the amplitude A of the secondary path filter C^1 to the previous value of the amplitude A of the secondary path filter C^1 is equal to or less than a prescribed value. The same method can be applied to the determination of the variation ΔP of the phase P of the secondary path filter C^1.

In the above embodiment, the update process unit 37 copies the value of the secondary path filter C^1 to the auxiliary secondary path filter C^1*p* at a timing of the adaptive update of the secondary path filter C^1 (step ST28 to ST30). In another embodiment, the update process unit 37 may copy the value of the secondary path filter C^1 to the auxiliary secondary path filter C^1*p* at a timing different from the adaptive update of the secondary path filter C^1 (for example, at a timing of the adaptive update of the control filter W1).

Figure 8:
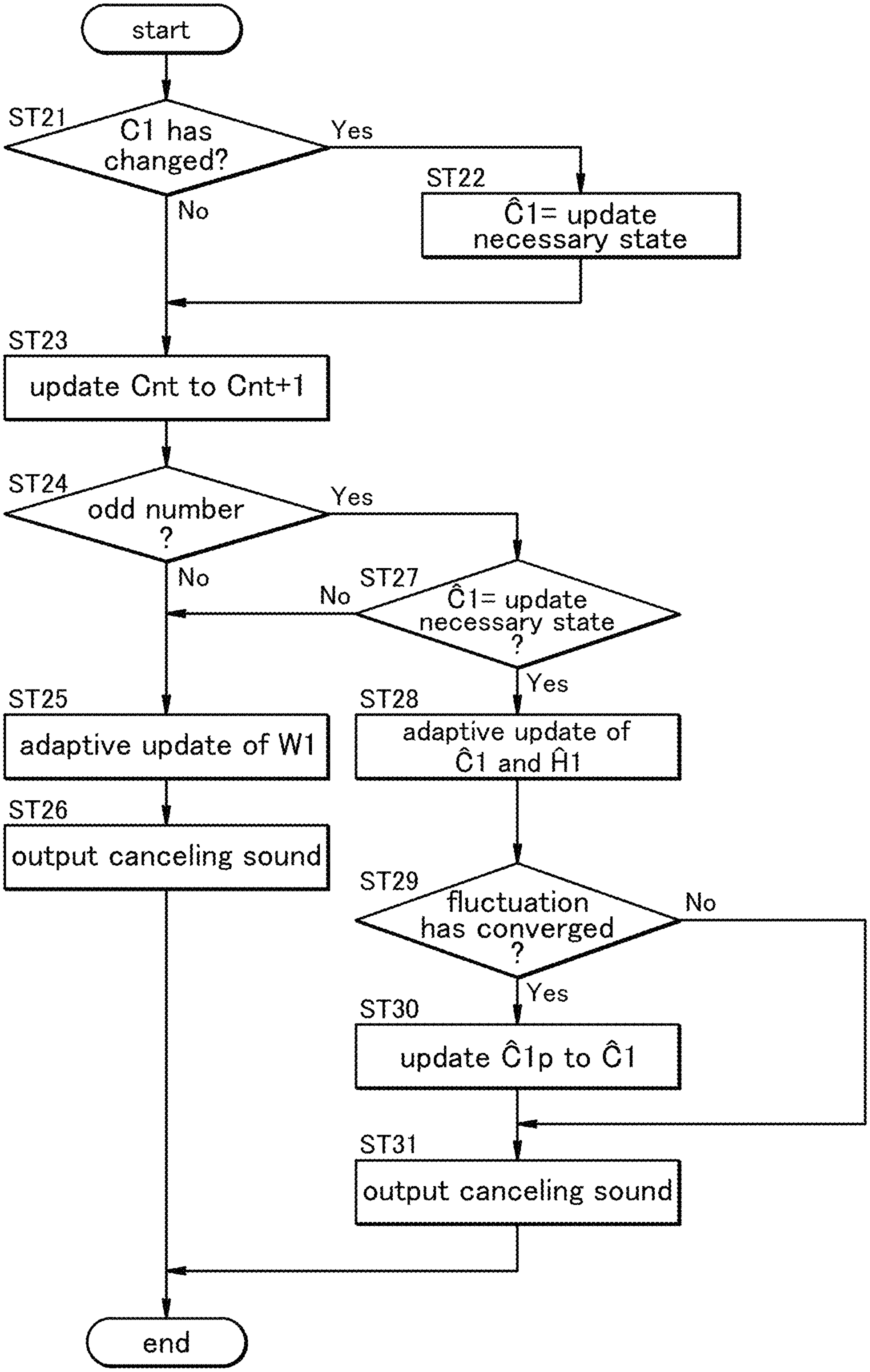
FIG. 8 is a flowchart showing an update process according to another embodiment.

With reference to FIG. 7, in the above embodiment, in a case where the fluctuation of the secondary path filter C^1 has not converged (step ST29: No), the first speaker 21 outputs the canceling sound y1 after the update process unit 37 updates the number of times Cnt to Cnt+1 (steps ST31 and ST32). With reference to FIG. 8, in another embodiment, in a case where the fluctuation of the secondary path filter C^1 has not converged (step ST29: No), the first speaker 21 may output the canceling sound y1 without the update of the number of times Cnt to Cnt+1 by the update process unit 37 (step ST31). That is, in another embodiment, the process of step ST32 may be omitted. Accordingly, in the next update process, step ST24 becomes "No", and the control filter W1 is adaptively updated (step ST25). Accordingly, in a case where the transfer function C1 of the secondary path changes, the adaptive update of the control filter W1 (step ST25) and the adaptive update of the secondary path filter C^1 (step ST28) are performed alternately.

In the above embodiment, the second microphone 24 is used as the reference microphone for generating the determination signal. In another embodiment, a dedicated reference microphone may be provided for generating the determination signal. In such a case, the reference microphone may generate the determination signal based only on the canceling sound y1 and the noise d. In other words, the reference microphone may generate the determination signal based on at least the noise d.

In the above embodiment, the controller 25 performs the update process to adaptively update the control filter W1, the secondary path filter C^1, and the primary path filter H^1. In another embodiment, the controller 25 may perform the update process to adaptively update the control filter W2, the secondary path filter C^2, and the primary path filter H^2. In such a case, the second microphone 24 may be used as the error microphone and the first microphone 23 may be used as the reference microphone.

<Modifications>

In the above first to fifth embodiments, the noise reduction system 1 is applied to the vehicle cabin 4 of the vehicle 3. In another embodiment, the noise reduction system 1 may be applied to an interior space of a moving body (for example, a ship or an aircraft) other than the vehicle 3, or to an interior space of a fixed object (for example, a house).

Concrete embodiments of the present invention have been described in the foregoing, but the present invention should not be limited by the foregoing embodiments and various modifications and alterations are possible within the scope of the present invention.

The invention claimed is:

1. An active noise reduction system, comprising:

a canceling sound output device configured to output a canceling sound for canceling a noise;

an error microphone configured to generate an error signal based on the noise and the canceling sound; and a controller configured to control the canceling sound output device based on the error signal, wherein the controller includes:

a control filter configured to generate a control signal for controlling the canceling sound output device; and a secondary path filter that represents an estimation value of a transfer function of a secondary path from the canceling sound output device to the error microphone, the active noise reduction system further comprises a reference microphone provided separately from the error microphone, the reference microphone is configured to generate a determination signal based on at least the noise, and wherein the controller is configured to:

perform an update process for adaptively updating the secondary path filter;

determine whether fluctuation of the secondary path filter according to an adaptive update thereof has converged;

stop the adaptive update of the secondary path filter in a case where the fluctuation of the secondary path filter has converged;

determine whether the transfer function of the secondary path has changed based on the error signal and the determination signal in a state where the adaptive update of the secondary path filter is stopped; and resume the adaptive update of the secondary path filter in a case where the transfer function of the secondary path has changed.

2. The active noise reduction system according to claim 1, further comprising a second canceling sound output device provided separately from the canceling sound output device, wherein the controller includes a second control filter configured to generate a second control signal for controlling the second canceling sound output device, and the second control filter is configured to be adaptively updated based on the determination signal.

3. The active noise reduction system according to claim 2, wherein the controller includes a second secondary path filter that represents an estimation value of a transfer function of a second secondary path from the second canceling sound output device to the reference microphone, and the controller is configured to determine whether the transfer function of the second secondary path has changed based on the error signal and the determination signal.

4. The active noise reduction system according to claim 3, wherein the controller is configured to determine that the transfer function of the secondary path has changed in a case where a difference between the error signal and the determination signal is equal to or greater than a first reference value and a temporal variation of the error signal is equal to or greater than a second reference value, and determine that the transfer function of the second secondary path has changed in a case where the difference between the error signal and the determination signal is equal to or greater than the first reference value and a temporal variation of the determination signal is equal to or greater than the second reference value.

5. The active noise reduction system according to claim 1, further comprising a second canceling sound output device provided separately from the canceling sound output device, wherein the controller includes a second secondary path filter that represents an estimation value of a transfer function of a second secondary path from the second canceling sound output device to the reference microphone.

6. An active noise reduction system, comprising:

a canceling sound output device configured to output a canceling sound for canceling a noise;

an error microphone configured to generate an error signal based on the noise and the canceling sound; and a controller configured to control the canceling sound output device based on the error signal, wherein the controller includes:

a control filter configured to generate a control signal for controlling the canceling sound output device; and a secondary path filter that represents an estimation value of a transfer function of a secondary path from the canceling sound output device to the error microphone, the active noise reduction system further comprises a reference microphone provided separately from the error microphone, the reference microphone is configured to generate a determination signal based on at least the noise, and the controller is configured to determine whether the transfer function of the secondary path has changed based on the error signal and the determination signal, wherein the controller is configured to determine that the transfer function of the secondary path has changed in a case where a difference between the error signal and the determination signal is equal to or greater than a first reference value and a temporal variation of the error signal is equal to or greater than a second reference value.

7. The active noise reduction system according to claim 6, wherein the controller is configured to determine that the transfer function of the secondary path has changed in a case where the difference between the error signal and the determination signal is equal to or greater than the first reference value, the temporal variation of the error signal is equal to or greater than the second reference value, and the error signal is equal to or greater than a third reference value.

* * * * *